United States Patent [19]

Statnick et al.

[11] Patent Number: 4,724,130
[45] Date of Patent: Feb. 9, 1988

[54] RECOVERY OF PROMOTERS USED IN FLUE GAS DESULFURIZATION

[75] Inventors: Robert M. Statnick, Pittsburgh; Duane C. McCoy, McMurray, both of Pa.

[73] Assignee: Conoco Inc., Wilmington, Del.

[21] Appl. No.: 889,728

[22] Filed: Jul. 28, 1986

[51] Int. Cl.⁴ .............................................. B01D 21/00
[52] U.S. Cl. ................................... 423/208; 423/155; 423/179; 423/205; 423/244; 423/635; 423/641
[58] Field of Search ............... 423/179, 190, 205, 208, 423/244, 242

[56] References Cited

U.S. PATENT DOCUMENTS

| | | | |
|---|---|---|---|
| 4,201,753 | 5/1980 | Dayen | 423/242 A |
| 4,255,402 | 3/1981 | Lowell | 423/242 A |
| 4,366,133 | 12/1982 | Rader et al. | 423/497 |
| 4,385,039 | 5/1983 | Lowell et al. | 423/244 A |
| 4,388,283 | 6/1983 | Abrams et al. | 423/244 A |
| 4,442,079 | 4/1984 | Donnelly et al. | 423/259 |
| 4,452,765 | 6/1984 | Peterson et al. | 423/242 |
| 4,454,101 | 6/1984 | Garrison et al. | 423/242 A |
| 4,472,364 | 9/1984 | Bauerle et al. | 423/242 |
| 4,559,211 | 12/1985 | Feldman et al. | 423/244 |
| 4,571,330 | 2/1986 | Krigmont et al. | 423/242 |
| 4,590,049 | 5/1986 | Stavdinger | 423/244 |
| 4,600,568 | 7/1986 | Yoon et al. | 423/242 |
| 4,613,487 | 9/1986 | Yoon et al. | 423/242 |
| 4,623,523 | 11/1986 | Abrams et al. | 423/244 A |

Primary Examiner—Curtis R. Davis
Assistant Examiner—Anthony McFarlane
Attorney, Agent, or Firm—Cortlan R. Schupbach

[57] ABSTRACT

In flue gas desulfurization, sorbent promoters are recovered by mixing collected particulates with water to form a slurry. The slurry is dewatered and wet solids are disposed. The recovered material contains water soluble desulfurization promoters and is reinjected in a flue gas desulfurization humidification system. The recycle allows recovery of water soluble promoters and reduces consumption. In addition, for promoters having undesirable disposal characteristics, the system improves the disposal characteristics of the waste solids.

5 Claims, 1 Drawing Figure

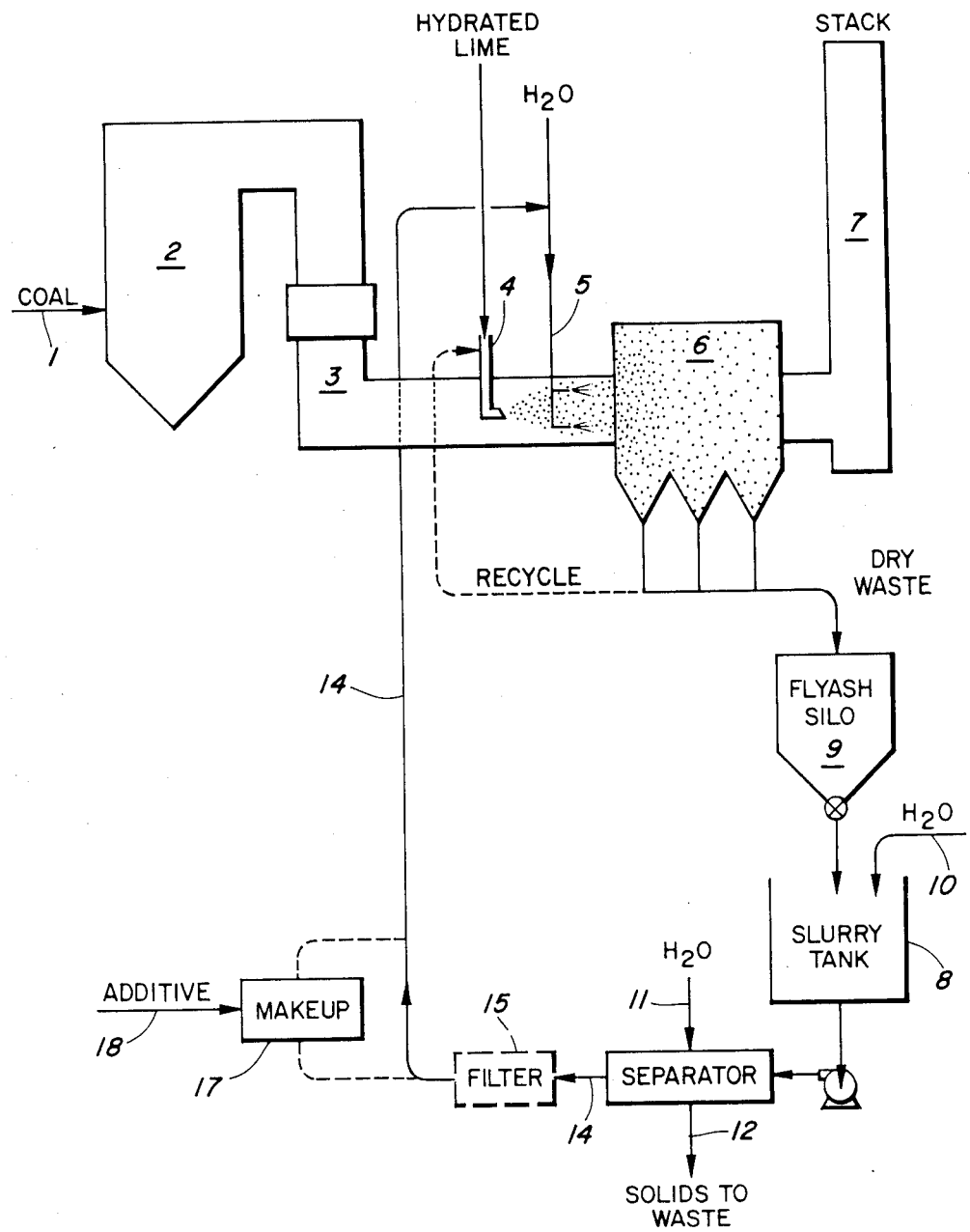

RECOVERY OF PROMOTERS USED IN FLUE GAS DESULFURIZATION

BACKGROUND OF THE INVENTION

Efforts to reduce sulfur emissions in gaseous products resulting from the combustion of sulfur-containing fuels have been made of late in order to comply with environmental regulations. Many processes attempt to reduce or eliminate sulfur in fuels prior to the fuels combustion. Many processes propose the addition of compounds to the combustion zone for the purpose of reacting with and removing the gaseous sulfur compounds from the combustion products. However, other processes remove sulfur compounds from the gaseous combustion products by chemical reaction downstream of the combustion device.

U.S. Pat. No. 4,185,080 discloses a combustion gas desulfurization process when a powdered sorbent such as limestone or dolomite is added to a combustion zone and a portion of the solids collected from the flue gas is reactivated and returned for injection into or downstream of the combustion zone. An earlier U.S. Pat. No. 3,320,906 teaches mixing limestone with the coal being fed to a boiler with the flue gas then being passed to a wet scrubber for additional capture of sulfur compounds by calcined limestone.

One approach to chemical treatment to effect flue gas desulfurization is dry treatment when the treating reagent is a solid powder both entering and leaving the contacting zone. However, in order to be effective, most dry powders must be in a humidified atmosphere in order to promote the absorption of the sulfur compounds into the sorbent.

Further, it has been found that certain additives promote the absorption of sulfur dioxide, $SO_2$, by these dry sorbents. Such sulfur promoters are used in a small amount relative to the main absorption material such as hydrated lime or dolomite primarily calcium base materials in order to enhance sulfur absorption. In this way, humidification and promotion, the absorption capability of such calcium base materials can be raised from about 50 percent $SO_2$ removal to over 70 percent $SO_2$ removal (at a Ca/S mole ratio of about 2/1).

Numerous site specific factors such as proximity to reagent source, space availabilty and extent of sulfur reduction required must enter into the selection of the process used at each combustion site. However, in each site some concerns remain the same, such as cost of reagents, cost of disposal and cost of absorbents. When using promoters such as alkali metal promoters and the like, it is necessary not only to consider the cost of the promoter in relation to the calcium based absorbent but also the cost of disposal. When using the most effective sodium and potassium based absorbents, disposal may become a problem since these materials must be "stabilized" or placed in a form where they will not enter the environment in active concentrations. It is necessary to lower the amount of such materials in disposed flyash particulate matter to below 1½ percent by weight in order to avoid disposal problems.

It would therefore be of great benefit to provide a method for recovering absorption promoters from particulate flyash containing said promoters in order to reduce absorption expense and reduce disposal problems.

It is therefore an object of the present invention to provide a method for recovering absorption promoters from hydrate modified flyash generated during the flue gas desulfurization processes. Other objects will become apparent to those skilled in this art as the description proceeds.

We have now discovered that water soluble desulfurization promoters can be recovered from hydrate-modified flyash containing said promoters when said flyash is formed by combustion of sulfur-containing fuels and sulfur absorbing calcium and magnesium compounds are added to the flue gas after the combustion zone in the presence of such promoters. The process comprises collecting the particulate flyash in a particulate control device and separating said flyash into recovery and disposal streams then mixing the disposal flyash stream with water to form a slurry containing up to 30 percent solids and recycling the recovery stream to the flue gas for further desulfurization. The slurry formed by mixing the disposal flyash stream is then dewatered to a water content of from about 10 to about 50 percent by weight to form a wet cake and a recovered water stream containing the water soluble absorption promoters. The wet cake is then disposed and the recovered water soluble absorption promoters in the recovered water are again placed into contact with hot flue gases in the presence of calcium and magnesium sulfur absorbing compounds to form the hydrate modified fly ash which is then again recovered into two streams.

In general, recovery of sodium values from waste streams is known. Representative but non-exhaustive of such art is U.S. Pat. No. 3,870,871 wherein in a dual alkali process, alkali metal hydroxides are recovered in a scrubber which form sulfites or sulfates. Spent sorbent is oxidized such as from bisulfite to sulfate and then contacted with calcium oxide to regenerate sodium hydroxide. This patent teaches recovering and recycling water soluble additives in general from particulates to lower the sodium content and then disposing of the solubilized waste. U.S. Pat. No. 3,920,795 shows dewatering of calcium containing slurry. U.S. Pat. No. 4,385,039 removes sulfur oxides with solid sorbents using alkali metals and recycle liquids to dissolve sorbents then filtering and regenerating.

BRIEF DESCRIPTION OF THE DRAWING

In the drawing the sole FIGURE represents a flow diagram partially schematic of a flue gas desulfurization process according to the present invention with recovery of absorbents values and recycling of unused calcium and magnesium sulfur absorbent components.

DETAILED DESCRIPTION OF THE INVENTION

Referencing the FIGURE, a feed-containing sulfur such as coal is inserted through line (1) into boiler (2) where combustion occurs. Hot flue gases pass through exiting flue duct (3) in which duct fresh hydrated lime (4) is injected. Downstream of said lime injection humidification water is injected normally containing flue gas desulfurization promoters, al of which are injected through line (5). Subsequent to the injection of the absorbent and humdification water with promoters, the now dry particulate flyash containing sulfur compounds unreacted absorbent and promoters is collected in a particle control device such as a baghouse or an electrostatic precipitator (ESP) (6) afterwhich the flue gases exit through stack (7). The collected hydrate modified flyash can be divided into at least two streams, one stream being a recycle steam containing unreacted calcium and magnesium sulfur absorbents. The second steam is normally a dry waste steam which is sent to disposal. However, in the present invention, this dry waste stream is passed to a slurry tank (8) usually through a flyash collection silo (9). This slurry tank has added makeup water added through line (10) and once a slurry concentration of up to 30 percent solids is formed is passed through a separating device such as a centrifuge or a filter which may also have added additional wash water through line (11). The separating device generates a wet cake waste stream containing very low promoter values through line (12) which is sent to disposal. The recovery water stream passes through line (14) back to the injection point (5) in the flue gas, and is reinjected with fresh humidification water containing sorbent promoters.

In a preferred embodiment of the present invention, as shown in the drawing, the recovery water stream is again passed through a particle control device such as a fine filter (15) before being returned to the flue duct. In a most preferred embodiment, the return recovery water line (14) may be diverted through a device (17) containing makeup additives which are entered through line 18.

Thus the present invention generally deals with removing sulfur combustion products such as sulfur dioxide and sulfur trioxide by injection of a finely divided dry sorbent powder such as calcium hydrate, magnesium hydrate whether in the form of lime or dolomite or mixtures of these, into an exiting flue gas duct containing sulfurcontaining gases. A short distance downstream in the duct the duct is humidified wherein a water stream containing absorption promoters is injected. The humidified flue gas passes by way of the duct to the solids collector and thereafter to the stack. The solids removed in the collector will normally comprise a mixture of flyash and spent sorbent as well as promoter values and said collected particulate flyash is then treated to recovery sorbent values for passing to the present invention.

In the present invention, it is necessary to control the humidity or approach to saturation of the flue gas containing sorbent and humidification water. It is preferable to approach the dew point at the inlet to the solids collector as closely as possible without causing operating problems. A more humid flue gas permits prolonged existence of a liquid film on the sorbent and the reaction of gaseous sulfur compounds in a liquid solution is much more rapid than with a solid particle. It is likewise necessary that the absorption promoters be water soluble in order to enhance this reaction. Too close an approach to the dew point may cause clogging and plugging of the surfaces of bag filters or ESP collector plates and to cause excessive duct corrosion. Therefore, an approach to within about 35° C. of but no nearer than about 10° C. of the saturation temperature is preferred.

Representative but nonexhaustive examples of desulfurization promoters useful in the present invention are $Na_2CO_3$, $NaOH$, $NaCl$, $NaNO_3$, $Na_2SO_3$, $CaCl_2$, $KCl$, and $FeCl_3$, $Na_2SO_4$, $NaNO_2$, $NaHCO_3$.

The instant invention is more concretely described with reference to the examples below. The examples are provided to illustrate the present invention and not to limit it.

A laboratory evaluation of various water soluble inorganic additives indicates that a significant improvement in sorbent efficiency is possible. All sodium base compounds evaluated were effective including $Na_2CO_3$, $NaOH$, $NaCl$, $NaNO_3$, and $Na_2SO_3$. In addition various chlorides had some effectiveness including $CaCl_2$, $KCl$, and $FeCl_3$. Utilizing the sodium and chloride compounds, desulfurization performance of hydrated lime improved up to 100 percent in lab tests.

Table 1 shows the positive effects of the five sodium based additives on saturated calcium utilization in the lab tests. Relative increases in the saturated utilization were greater at a higher additive dosage over the range up to 0.2 $Na^+/Ca^{++}$ ratio by mol. NaCl gave the best enhancement effect. The NaCl promotions of 0.05–0.2 $Na^+/Ca^{++}$ ratios by mol approximately doubled the saturated calcium utilization (80–114 percent relative increases over the unpromoted hydrated lime). The next best result was obtained with $NaNO_3$ (0.1 $Na^+/Ca^{++}$ ratio sample promoted during hydration). For NaOH, $Na_2CO_3$ and $Na_2SO_3$ the relative increases were about 40–60 percent at 0.1 $Na^+/Ca^{++}$ ratio with somewhat better results with the samples promoted during hydration. With $Na_2CO_3$, the relative increases in the saturated utilization was greater for the samples promoted after hydration than those during hydration. Only about 30 percent relative increase in the saturated utilization was observed with 0.1 $Na^+/Ca^{++}$ ratio $Na_2CO_3$ promotion during hydration. Of the sodium compounds, NaOH and $Na_2CO_3$ acted as co-sorbents by capturing $SO_2$ to form $Na_2SO_3$ or $Na_2SO_4$. If the other compounds (NaCl, $Na_2SO_3$ and $Na_2NO_3$) are converted to NaOH by reacting with hydrated lime ($Ca(OH)_2$) during the process of the promotion, these compounds also act as co-sorbents like NaOH and $Na_2CO_3$ in the lab tests. However, the observed increases in the saturated utilization were significantly greater (at least three times) than the stoichiometric $SO_2$ captures by these sodium additives as $Na_2SO_3$ or $Na_2SO_4$. These results indicate that the major additive effect of sodium compounds is the enhancement of the $SO_2$ capture reaction of hydrated lime.

Four metal chloride salts also showed positive effects (Table 2). $CaCl_2$, KCl and $FeCl_3$ were as effective as the sodium-based additives. $MgCl_2$ was less effective. All the results in Table 2 were obtained with the additives being incorporated during hydration. $CaCl_2$ was also added after hydration. Unlike the strong positive effect with the promotion during the hydration, $CaCl_2$ did not improve the performance of hydrated lime when added after hydration. The latter technique produced a significant reduction in the surface area of the sample.

TABLE 1

EFFECTS OF SODIUM-BASED ADDITIVES ON SATURATED CALCIUM UTILIZATION

| Additive | Dosate, $Na^+/Ca^{++}$ by mol | % Relative Increase in Saturated Calcium Utilization | |
|---|---|---|---|
| | | Promotion After Hydration | Promotion During Hydration |
| NaOH | 0.05 | 33 | 45 |
| | 0.10 | 41 | 55 |
| NaCl | 0.05 | — | 91 |
| | 0.10 | 80 | 114 |
| | 0.20 | 97 | — |
| $Na_2CO_3$ | 0.10 | 47 | 27 |
| | 0.20 | 90 | 59 |
| $Na_2SO_3$ | 0.10 | — | 59 |
| $NaNO_3$ | 0.10 | — | 82 |

TABLE 2

EFFECT OF INORGANIC CHLORIDE COMPOUNDS
ON HYDRATED LIME ACTIVITY

| Additive | Additive Conc., mols/mol Ca(OH)$_2$ | % Increase in Saturated Utilization* |
|---|---|---|
| CaCl$_2$ | 0.10 | 100 |
| KCl | 0.10 | 77 |
| FeCl$_3$ | 0.05 | 45 |
| MgCl$_2$ | 0.10 | 14 |

*150° F., 60% relative humidity, 1000 ppm SO$_2$, 60 min contact time.

Thus the present invention provides many advantages over the known art in that recovery and recycle of water soluble additives is provided together with lower sodium content in the waste solids to allow easier disposal of the solids and reducing the cost of flue gas desulfurizations.

A calculation was carried out to show economic efficiencies for the application of the present process utilizing a base case of soda ash annual consumption of 8203 tons/year at a cost of $140/ton ($1,148,000). Without the practice of the present invention, the waste flyash stream contained about 1.5 weight percent sodium as sodium metal and required containment in lined ponds and the like.

Utilizing the present invention, the soda ash annual consumption is lowered to about 2461 tons/year or about $344,000 at the cost of $140/ton. Sodium content of the waste is lowered to from about 1.5 weight percent to about 0.4 weight percent. Variable cost savings in the example are $804,000 for soda ash and $17,000 disposal costs. The parameters for these results are set forth in Tables 3 and 4 below.

TABLE 3

CASE STUDY BOILER/FUEL PARAMETERS

| Boiler Size 400 MWe | | Coal Composition, % Dry Basis | |
|---|---|---|---|
| Net Heat Rate | 9745 Btu/kWh | H | 4.27 |
| | | C | 66.35 |
| % SO$_2$ Removal | 59.3 | N | 1.02 |
| | | O | 7.80 |
| Coal Feed Rate | 181.39 Tph | S | 2.27 |
| | | Ash | 18.29 |
| Total Waste | 41.17 Tph | HHV | 11,477 |
| | | Moisture | 12.00 |
| Humidifier Exit | | | |
| Temperature | 150° F. | | |
| Capacity Factor | 65% | | |

TABLE 4

PROCESS STREAM ANALYSIS FOR CASE STUDY

| Stream Description | 9 Fly Ash | 10 Slurry Water | 12 Waste to Disposal | 14 Filtrate To Humidifer | 11 Final Wash Water |
|---|---|---|---|---|---|
| Component | | | | | |
| H$_2$O | 0 | 72.02 | 27.43 Tph | 72.02 Tph | 27.43 |
| Ash | 41.17 Tph | Tph — | 40.72 Tph | — | Tph — |
| Sodium | 0.62 Tph | — | 0.17 Tph | 0.45 Tph | — |

Thus the present invention provides a simple solution to a known problem by enhancing the desulfurization of flue gas resulting from the combustion of a sulfur-containing fuel, reduction of cost to carry out such desulfurization, enhancement of the desulfurization, reduction of the promoters disposed as waste and increasing sorbent utilization.

While certain embodiments and details have been shown for the purpose of illustrating this invention, it will be apparent to those skilled in this art that various changes and modifications may be made herein without departing from the spirit or scope of the invention.

We claim:

1. A method for recovering water soluble absorption promoters from flyash containing said promoters, wherein said flyash is formed by combustion of sulfur containing fuel and flue gases resulting from said combustion are treated with sulfur absorbing calcium and magnesium compounds in the presence of absorption promoters, the method consisting essentially of
   (a) collecting flyash in a particulate control device and separating said flyash into recovery and disposal streams,
   (b) mixing the disposal flyash stream with water to form a slurry containing up to 30 percent solids,
   (c) dewatering the slurry of (b) in a separation device to a water content of from 10 to about 50 percent by weight to form a wet cake and a recovered water stream containing absorption promoters, and disposing of said wet cake,
   (d) placing said water stream containing recovered absorption promoters into contact with hot flue gases in the presence of calcium and magnesium sulfur absorbing compounds to form a particulate flyash, and
   (e) collecting said flyash in a particulate control device.

2. A method is described in claim 1 wherein the recovered water stream of (c) is further treated to remove fine particulate matter prior to the injection of step (d).

3. A method is described in claim 1 wherein additional water soluble promoters are added with makeup water prior to injection of step (d).

4. A method is described in claim 3 wherein the water soluble absorption promoters are sodium and potassium compounds.

5. A method is described in claim 4 wherein the sodium compound is at least one compound selected from the group consisting of NaOH, NaCl, NaNO$_3$, Na$_2$SO$_3$, Na$_2$SO$_4$, NaNO2, Na$_2$CO$_3$ and NaHCO3.

* * * * *